United States Patent
Qiao et al.

(10) Patent No.: US 8,782,102 B2
(45) Date of Patent: Jul. 15, 2014

(54) COMPACT AGGREGATION WORKING AREAS FOR EFFICIENT GROUPING AND AGGREGATION USING MULTI-CORE CPUS

(75) Inventors: Lin Qiao, San Jose, CA (US); Vijayshankar Raman, Sunnyvale, CA (US); Frederick R Reiss, Sunnyvale, CA (US)

(73) Assignee: International Business Machines Corporation, Armonk, NY (US)

( * ) Notice: Subject to any disclaimer, the term of this patent is extended or adjusted under 35 U.S.C. 154(b) by 480 days.

(21) Appl. No.: 12/889,789

(22) Filed: Sep. 24, 2010

(65) Prior Publication Data
US 2012/0078980 A1 Mar. 29, 2012

(51) Int. Cl.
G06F 17/30 (2006.01)

(52) U.S. Cl.
USPC .......................................... 707/812; 711/118

(58) Field of Classification Search
USPC .......................................................... 707/812
See application file for complete search history.

(56) References Cited

U.S. PATENT DOCUMENTS

| | | | |
|---|---|---|---|
| 5,511,190 | A | 4/1996 | Sharma et al. |
| 7,493,316 | B2 | 2/2009 | Chaudhuri et al. |
| 2002/0099691 | A1 | 7/2002 | Lore et al. |
| 2003/0093622 | A1* | 5/2003 | Desota et al. ................ 711/129 |
| 2003/0145022 | A1 | 7/2003 | Dingley |
| 2006/0059474 | A1 | 3/2006 | Bhansali et al. |
| 2008/0222111 | A1 | 9/2008 | Hoang et al. |

OTHER PUBLICATIONS

IEEE 100: The Authoritative Dictionary of IEEE Standards Terms, 7th edition, 2000, pp. ii and 836.*

Qiao et al. "Main-Memory Scan-Sharing for Multi-core CPUs" Proceedings of the VLDB Endowment, System Centric Optimization, vol. 1, Issue 1, (Aug. 2008), pp. 610-621.

Chang et al "Cooperative Cache Partitioning for Chip Multiprocessors" Proceedings of the 21st Annual International Conference on Supercomputing, Architecture—Multiprocessor Systems, (2007), pp. 242-252.

Chen et al. "Scheduling Threads for Constructive Cache Sharing on CMPs" . Proceedings of the 19th Annual ACM Symposium on Parallel Algorithms and Architectures, Multicore Architectures and Algorithms, (2007), pp. 105-115.

Cieslewicz et al. "Adaptive Aggregation on Chip Multiprocessors" . Proceedings of the 33rd International Conference on Very Large Data Bases, Research Sessions: Novel Architectures, (2007), pp. 339-350.

"Intel Architecture Software Developer's Manual vol. 2: Instruction Set Reference", 854 pages.

Harizopoulos et al. "QPipe: A Simultaneously Pipelined Relational Query Engine". International Conference on Management of Data, (2005), pp. 383-394.

* cited by examiner

*Primary Examiner* — Albert Phillips, III
(74) *Attorney, Agent, or Firm* — Jeffrey T. Holman (57) ABSTRACT

A system is described for creating compact aggregation working areas for efficient grouping and aggregation using multi-core CPUs. The system implements operations including computing a running aggregate for a group within a business intelligence (BI) query, and identifying a location to store running aggregate information within an aggregation working area of a cache. The aggregation working area includes first and second data structures. The first data structure stores running aggregate information that is associated with a group that is accessed frequently relative to a threshold. The second data structure stores running aggregate information that is associated with a group that is accessed infrequently relative to the threshold. The operations also include storing the running aggregate information in either the first or second data structure of the aggregation working area based on a characterization of the group as a frequently or infrequently accessed group.

20 Claims, 7 Drawing Sheets

COMPACT AGGREGATION WORKING AREAS FOR EFFICIENT GROUPING AND AGGREGATION USING MULTI-CORE CPUS

BACKGROUND

Business intelligence (BI) refers to the process of using available business data to gain a better understanding of business operations. Often, BI systems facilitate gathering and analyzing the business data to determine trends and to optimize related business practices. One example includes tracking and analyzing sales revenue related to various products, services, consumer groups, geographic locations, and so forth, in order to determine product development, marketing, and sales strategies. Another example includes tracking and analyzing costs associated with specific divisions or departments within a company in order to improve productivity and efficiency while controlling related expenses.

The business data may be stored in a centralized location that is controlled by a database management system (DBMS). In order to analyze available business data, BI queries are formed and executed on the business data. Each BI query performs functions to gather specific data from the available business data and perform an analytical operation on the gathered data.

In general, BI queries are complex. Each BI query usually has a large number of aggregates to compute. An aggregate is the result of using mathematical operations to combine the selected business data. More specifically, an aggregation function generates an aggregate value (i.e., the aggregate) from a collection of input values (i.e., the selected business data). Some examples of typical aggregate functions include SUM, COUNT, COUNT BIG, AVG, STDDEV, VARIANCE, COVARIANCE, and so forth.

Conventionally, a data structure is used for storing running aggregates that are calculated. A similar data structure can be used in both hash-based and sorted-based grouping and aggregation. This data structure is generally referred to as the aggregation working area. The aggregation working area is typically cache-resident in order to achieve good performance during the grouping and aggregation phase.

However, typical implementations of the aggregation working area are not particularly suitable for implementation with multi-core processors (e.g., CPUs). With the advent of multi-core processors, the computational power on a single server is constantly growing. Such symmetric multiprocessing (SMP) is used broadly in BI platforms for multi-threaded processing. Usually, there is one thread running on each CPU core. Unfortunately, the total cache size has not kept up with the growth of the number of processing cores. Hence, the available cache is decreasing relative to each core. This trend results in more and more cache contention among threads. If the accumulated size of the aggregation working area used for grouping and aggregation by each thread exceeds the cache size, then the aggregation working area for each thread will thrash in and out of cache. This thrashing increases the input/output (I/O) demands and decreases the productivity of the BI platform.

SUMMARY

Embodiments of a computer program product are described. In one embodiment, the computer program product includes a computer useable storage medium to store a computer readable program that, when executed on a computer, causes the computer to perform operations for creating compact aggregation working areas for efficient grouping and aggregation using multi-core CPUs. The operations include computing a running aggregate for a group within a business intelligence (BI) query, and identifying a location to store running aggregate information within an aggregation working area of a cache. The aggregation working area includes first and second data structures. The first data structure stores running aggregate information that is associated with a group that is accessed frequently relative to a threshold. The second data structure stores running aggregate information that is associated with a group that is accessed infrequently relative to the threshold. The operations also include storing the running aggregate information in either the first or second data structure of the aggregation working area based on a characterization of the group as a frequently or infrequently accessed group.

In some embodiments, the running aggregate includes a value calculated during an aggregation operation, and the running aggregate information includes information related to the running aggregate. In some embodiments, the running aggregate information includes an intermediate or final value of the running aggregate in response to a determination that the group is accessed frequently relative to the threshold. In some embodiments, the operations also include estimating the final value of the running aggregate, and estimating a number of bits for storing the final value of the running aggregate. The estimated number of bits to store the running aggregate is based on the estimated final value of the running aggregate and is less than a standard number of bits for a standard working data type of the running aggregate. In some embodiments, the operations also include allocating the estimated number of bits within the first data structure for storing the running aggregate. The allocated bits for the running aggregate are located at a first location within the first data structure. In some embodiments, the operations also include allocating bits at a second location within the first data structure for storing a second running aggregate. The second location is substantially adjacent to the first location so that the second running aggregate at the second location is located substantially adjacent to the running aggregate at the first location.

In some embodiments, the operations also include incrementally maintaining the running aggregate during a series of aggregation operations. The aggregation operations include extracting a current value of the running aggregate from the allocated bits at the first location, casting the current value of the running aggregate to a standard data type of business data for which the running aggregate is computed, updating the current value of the running aggregate to reflect further aggregation with new business data, discarding extra bits from the updated value of the running aggregate, and storing the updated value of the running aggregate to the allocated bits at the first location. In some embodiments, the operations also include handling an overflow condition of the allocated bits at the first location. In some embodiments, handling the overflow condition includes detecting the overflow condition in response to a determination that the updated value of the running aggregate requires more bits than the allocated bits at the first location, and storing the current value (prior to updating) of the running aggregate in another location of another data structure separate from the first and second data structures, resetting the current value of the running aggregate in the first data structure to zero, and storing an incremental value of the running aggregate in the first data structure.

In some embodiments, the running aggregate information includes a location identifier within the second data structure in response to a determination that the group is accessed infrequently relative to the threshold. In some embodiments, the location identifier within the second data structure includes a group identifier. In some embodiments, the second data structure is smaller than the first data structure. In some embodiments, the threshold includes a tuple threshold, and the frequently accessed group has a first number of tuples touching the group that is greater than the tuple threshold, and the infrequently accessed group has a second number of tuples touching the group that is less than the tuple threshold.

Other embodiments of the computer program product are also described. Similarly, corresponding embodiments of computer-implemented methods and systems are also described.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

In the following description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

While many embodiments are described herein, at least some of the described embodiments establish a balance between processor computations and memory or cache used as an aggregation working area so that grouping and aggregation are executed much more efficiently on multi-core CPUs. Some examples of supported aggregation data types include, but are not limited to, small integer, integer, big integer, decimal, decfloat, and duration of two values with date/time/timestamp data types. Some examples of supported aggregation operations include, but are not limited to: SUM, COUNT, COUNT BIG, AVG, STDDEV, VARIANCE, and COVARIANCE.

In some embodiments, the aggregation working area is implemented with multiple internal data structures that are used to service large, read-only queries. The internal data structures can be implemented on a temporary basis, as needed.

One of the internal data structures can be used to store information related to frequently accessed groups. In some embodiments, a decreased or minimized number of bits are used to represent running aggregates for frequently accessed groups. The number of bits can be based on estimation aggregate results using random samples. If a running aggregate overflows the allocated number of bits, a portion of the aggregate can be pushed to a larger aggregation working area with increased or full-size representation of the data types of the running aggregates.

Another of the internal data structures can be used to store information related to aggregates for infrequently accessed groups. In some embodiments, for the groups with very infrequent access, only row IDs (RIDs) are stored, instead of running aggregates. In other embodiments, another type of group ID may be used.

Also, the internal data structures can be implemented on a single computer or machine. Some of the embodiments described herein use a static, automatic caching policy based on predicted data sizes and update frequencies. By using embodiments of the aggregation working area described herein, the size of the aggregation working area for grouping and aggregation can be reduced, compared with conventional caching schemes. Also, embodiments of the aggregation working area described herein can provide better caching performance which results in better BI query performance.

Figure 1:
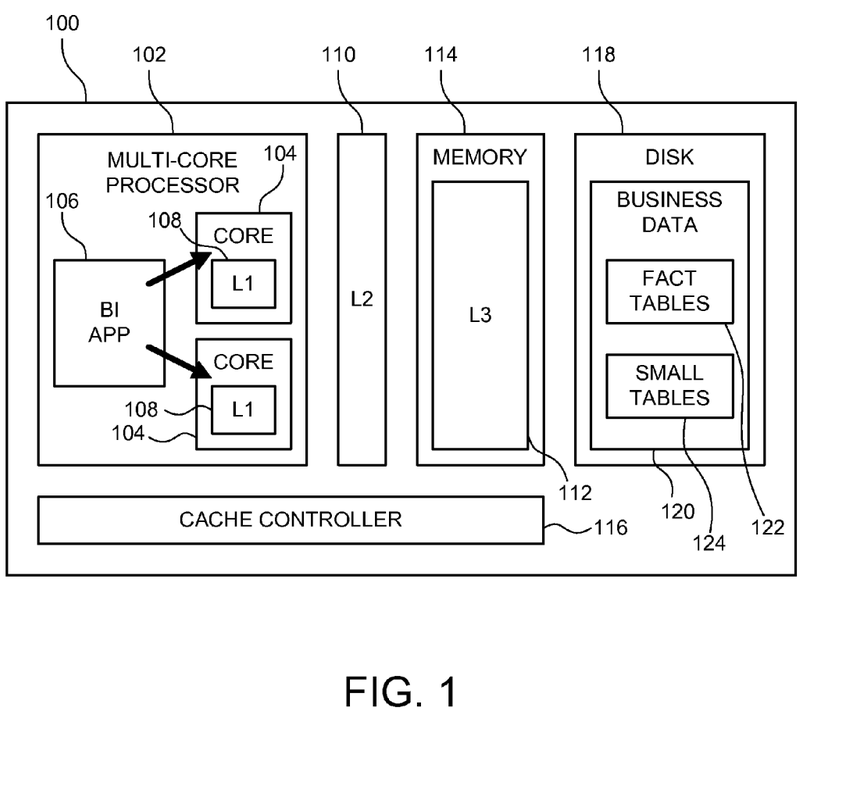
FIG. 1 depicts a schematic block diagram of one embodiment of a system for implementing a business intelligence (BI) application.

FIG. 1 depicts a schematic block diagram of one embodiment of a system 100 for implementing a business intelligence (BI) application 106. Although the system 100 shown in FIG. 1 is described with certain components and functionality, other embodiments of the system 100 may include fewer or more components to implement less or more functionality.

The illustrated system 100 includes a multi-core processor 102 that has two or more processing cores 104. In general, each processing core executes code (e.g., instructions) in order to implement the functionality of the system 100. More specifically, the cores 104 process code for one or more business applications 106. Each business application is designed to access and analyze available business data to gain a better understanding of business operations.

In order to provide high performance, the system 100 includes one or more hierarchical levels of cache memory. For reference, the illustrated system includes three levels of cache, which are designated as L1, L2, and L3. The first level of cache L1 108 is located at each core 104 of the multi-core processor 102. In general, this is the fastest type of cache, but is also the most expensive to implement because of its location on die with the processing cores 104. The second level of cache L2 110 is located off-die, but relatively close to the cores 104. The third level of cache L3 112 is located in a separate memory device 114. In general, each level of cache gets larger, less expensive, and slower as the distance increases between the cache and the cores 104. Although representative cache locations are shown in FIG. 1, other embodiments of the system 100 may implement various combinations of different levels of cache.

In one specific example, each core 104 in the multi-core processor 102 is an independent central processing unit (CPU). Each CPU sits at the top of a memory hierarchy consisting of 2-3 levels of cache and a relatively slow main memory. Each core has a private first level cache L1 108 that is very fast, but very small. Larger second level caches L2 110 and third level L3 caches 112 provide slower access to larger amounts of memory. In one embodiment, all of these levels of cache are implemented within the multi-core processor 102, and the largest cache (i.e., L3) is shared across all cores 104 on the processor die, while each processor core 104 maintains its own private cache at the higher caching layers (i.e., L1 and L2).

At each level of the hierarchy, for example, performance drops by one to two orders of magnitude and storage capacity increases by a factor of 2-4 at each cache layer, with a dramatic jump in capacity at the main memory layer. Even the largest processor caches may represent less than half of one percent of a modern computer's memory.

In contrast to main memory, the cache within the system 100 may be implemented mostly or entirely in hardware, with the cache and memory controllers making most low-level decisions about which regions of memory reside in which level of the hierarchy. Also, the efficiency of running BI queries can depend on keeping a large "working set" of data, including indexes, intermediate data structures, and executable code, in one or more levels of cache. The working set of data within the cache may include contiguous or non-contiguous blocks or other subdivisions of data The illustrated system 100 also includes a cache controller 116 that is capable of controlling some or all of the different levels of cache. Although shown as a separately illustrated box, the functionality of the cache controller 116 may be partially or wholly incorporated with other components of the system 100. For example, at least some of the functionality of the cache controller 116 may be implemented within the multi-core processor 102 to control operations of the L1 caches 108 at the processing cores 104.

For convenience in describing examples of the functionality that can be implemented within the system 100, the description herein references a caching hierarchy (also referred to as a caching and memory hierarchy). In general, the caching hierarchy includes any or all of the various levels of cache, as well as some or all of the cache controller. In some embodiments, the caching hierarchy also includes other levels of memory and corresponding memory controllers. Thus, functionality described as being implemented by the caching hierarchy may be implemented in one or distributed over several of the components that are included in the caching hierarchy. More detailed descriptions of functionality that may be implemented by embodiments of the caching hierarchy 130 are presented below in with reference to FIG. 2.

The system 100 also includes a disk 118, which is one type of electronic data storage device. Other embodiments of the system 100 may include other types of data storage devices or a combination of data storage devices. The disk 118 (or other type of data storage device) stores business data 120 that is processed by the processing cores 104 according to the BI application 106. In the illustrated embodiment, the business data 120 includes fact tables 122 and small tables 124. Other embodiments may include other types of business data 120. In some embodiments, some or all of the business data 120 may be stored in other locations (e.g., in a business data warehouse) that are separate from, but accessible by, the system 100.

Historically, the performance of BI systems has been limited by the input/output (I/O) workload. In particular, retrieving the business data 120 from the disk 118 is the main cost in query execution. Some conventional techniques address this I/O bottleneck by reducing the amount of data used by a query processor core 104. Some of these techniques include aggressive compression, column stores, and materialized views. Additionally, the use of relatively large main memories may allow an entire working set of a BI system to fit into random access memory (RAM), with large amounts of data stored in cache. This approach bypasses the traditional disk I/O bottleneck. In order to improve performance further, processor manufacturers are putting more processing cores 104 onto a CPU die. In a query using multiple processing cores 104, accessing main memory can be a performance limitation or bottleneck. Today, major processor vendors are shipping processors equipped with 4 separate processing cores, with 6- and 8-core processors in the pipeline.

In one embodiment, the multi-core processor 102 implements a query scheduler (not shown) to schedule queries for execution in conjunction with the BI application 106. The query scheduler may be implemented in hardware, software, or a combination of hardware and software. In certain embodiments, the query scheduler receives and manages a plurality of BI queries, including determining how and when to execute the queries. In one embodiment, the query scheduler assigns one or more queries to a specific processor core 104 for execution. The query scheduler also may determine a block of data for the query to scan.

Figure 2:
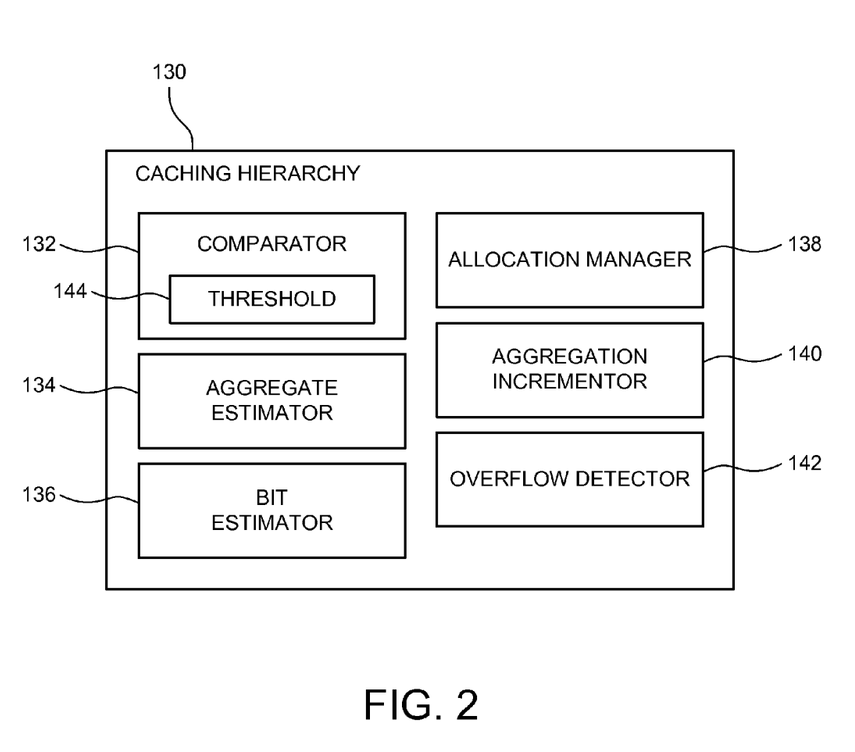
FIG. 2 depicts a schematic block diagram of one embodiment of the caching hierarchy of FIG. 1.

FIG. 2 depicts a schematic block diagram of one embodiment of the caching hierarchy 130 of FIG. 1. The illustrated caching hierarchy 130 includes a comparator 132, an aggregate estimator 134, and a bit estimator 136. The illustrated caching hierarchy 130 also includes an allocation manager 138, an aggregation incrementor 140, and an overflow detector 142. Although the caching hierarchy 130 is shown in FIG. 2 and described with certain components and functionality, other embodiments of the caching hierarchy 130 may include fewer or more components to implement less or more functionality.

In general, the components shown within the caching hierarchy 130 provide functionality to perform some or all of the operations related to storing aggregation information in at least one level of cache (e.g., L1, L2, and/or L3). In some embodiments, these components provide functionality to store information about running aggregates. In other embodiments, these components provide functionality to store other information related to the running aggregate operations.

Also, in some embodiments, some or all of the functionality described herein with respect to the components of the caching hierarchy 130 may be implemented at other locations within the system 100. For example, some or all of the functionality described herein may be integrated with and provided by the multi-core processor 102. In other embodiments, at least some of the functionality described herein is provided by execution of the business application 106.

Figure 3:
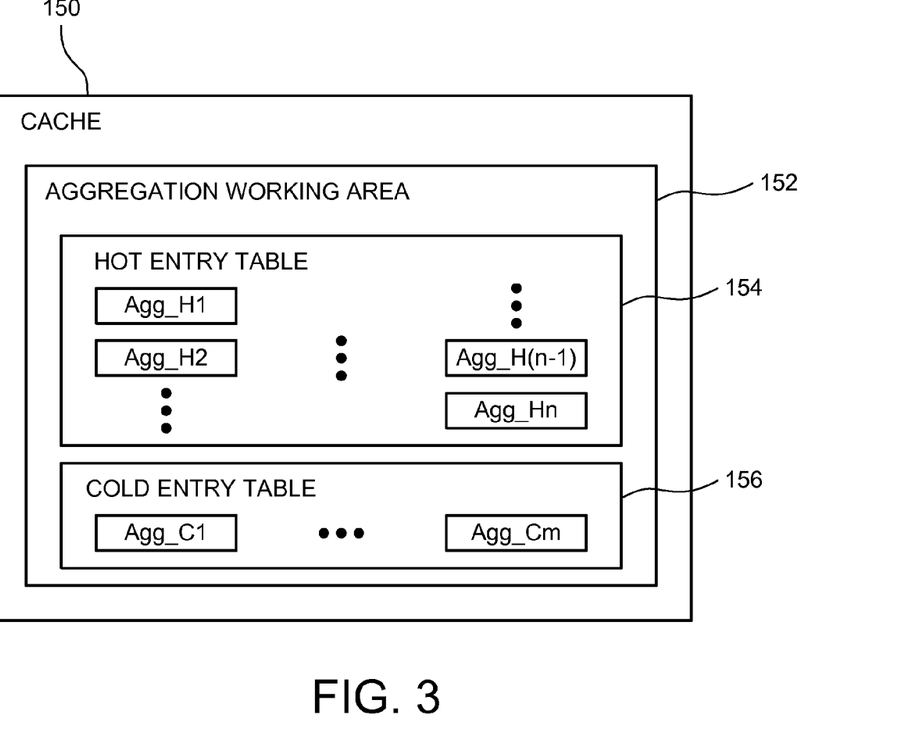
FIG. 3 depicts a schematic diagram of one embodiment of a cache for use in the system of FIG. 1.

Generally, the system 100 provides functionality to compute a running aggregate for a BI query. The system 100 then identifies a location to store running aggregate information within an aggregation working area of a cache. FIG. 3 depicts a schematic diagram of one embodiment of a cache 150 for use in the system 100 of FIG. 1. The depicted cache 150 is representative of at least a portion of one of the hierarchical levels of cache shown in FIG. 1. In the illustrated embodiment, the cache 150 includes an aggregation working area 152 that includes multiple data structures for different categories or classifications of aggregate information. Specifically, the illustrated aggregation working area 152 includes a hot entry table 154 and a cold entry table 156. The hot entry table 154 is used for running aggregate information (Agg_H1 through Agg_Hn) that is associated with frequently accessed aggregates or a frequently accessed aggregate group. Although not shown in detail, in one embodiment the format of each entry in the data structure containing the frequent or hot entry groups is (groupby value, agg_1, agg_2, ..., agg_n).

In contrast, the cold entry table 156 is used for running aggregate information (Agg_C1 through Agg_Cm) that is associated with infrequently accessed aggregates or an infrequently accessed aggregate group. Although not shown in detail, in one embodiment the format of each entry in the data structure containing the in-frequent or cold groups is (groupby code, RowID_1, ..., RowID_m), where m<<n and, in some cases, m=1. Examples of specific types of data that might be stored in the hot entry table 154 and the cold entry table 156 are described below with reference to FIGS. 4 and 5.

Separate data structures for storing and maintaining frequent and in-frequent groups are implemented in the aggregation working area 152 because each group may not be accessed equally often if there is skew in the distribution of group-by values after predicate evaluation. As one example, this may be applicable for group by columns with strong correlation with predicate columns. As another example, this may be applicable for group by columns with non-uniform distribution. Hence, there may be hot entries and cold entries in the aggregation working area 152. In the absence of separate data structures for the hot and cold entries, the random temporal access to the cold entries may purge the hot entries when the total desired size of the aggregation working area 152 cannot fit into the cache 150, even though the hot entries as a working set might actually fit in the cache 150. To make it worse, the cold entries have heavy tail, which can make the hot entries not cache-resident. Thus, the use of two separate tables, or data structures, can help to provide cache resources to the hot and cold entries in a non-uniform manner. In particular, one larger table may be implemented for the hot entries and another smaller table may be implemented for the cold entries. The cold entry table 156 does not need to have the same width as the hot entry table 154 and, hence, the overall size of the aggregation working area 152 can be smaller and/or accommodate a larger proportion of hot entries.

In one embodiment, the comparator 132 implements a comparison process to determine if an aggregate group is accessed frequently or infrequently relative to a threshold 144. The threshold may be a static number that establishes a standard for distinguishing between frequently and infrequently accessed aggregate groups. For example, if the threshold is a value of 2, then any aggregate group that is accessed more than two times may be classified as a frequently accessed aggregate group. The threshold may be inclusive or exclusive, depending on the implementations. Alternatively, the threshold may be dynamic and depend, for example, on other factors that may change in relation to a specific type or value associated with an aggregate group.

In one embodiment, the aggregate estimator 134 estimates a final value of a running aggregate. In most cases, the running aggregates do not need the full-size representation of their data types. For instance, a big integer is eight bytes, but a running aggregate SUM of type big integer may only need two bytes, because the final result of that aggregate is $2^{16}-1=65535$.

As one example, the aggregate estimator 134 may access a small number of sample values and extrapolate a final running aggregate value based on operations performed on the sample values. Other embodiments may use other techniques to estimate the final value of the running aggregate. As another example, the estimate of the final result for an aggregate uses random samples of the base data or statistics collected from the base data. If random samples are used, the result of an aggregate may be calculated after applying predicates on the random samples and extrapolating the result of an aggregate to the full data-set. Some statistics collected in a RDBMS can be used directly to extrapolate the aggregate result in the full data-set. For instance, a histogram with a detailed frequency distribution can be used to estimate SUM, when the predicate column is not correlated with any grouping or aggregation columns.

In one embodiment, the bit estimator 136 uses the estimated final value of the running aggregates to determine how many bits might be used to store the running aggregate information in the aggregation working area 152 of the cache 150. By estimating how many bits can be used to store the final value of the running aggregate, the allocation manager 138 can allocate fewer bits to store the running aggregate values in fewer bits than might otherwise be used based on a standard bit length for a typical working data type. For example, if a typical working data type uses 32 bits to store a number, but the bit estimator 136 estimates the final value of the running aggregate can be represented using only 17 bits, then the allocation manager 138 may allocate 17 bits to store the running aggregate information, thereby saving 15 bits of space in the aggregation working area 152 of the cache 150. As another example, for an aggregate on an integer column, if the estimated aggregate result is X, ceiling(log(X)) bits are sufficient to accommodate the running aggregate.

Figure 4:
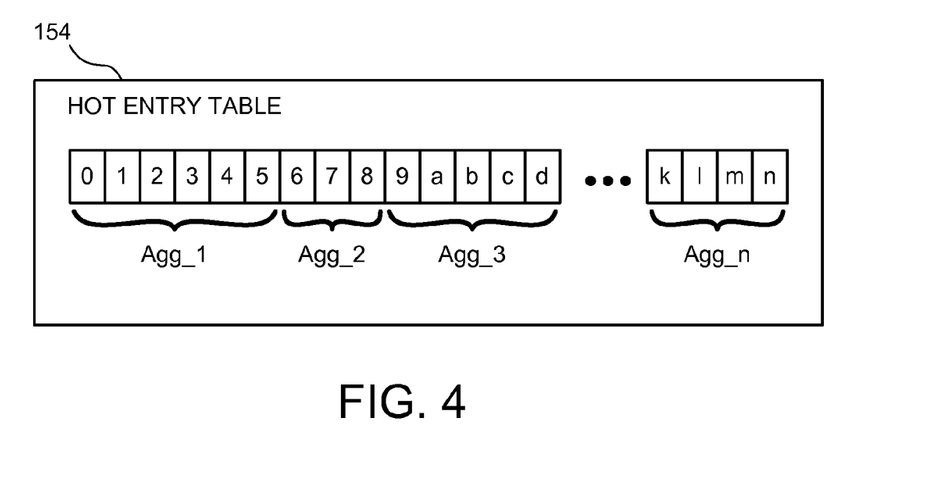
FIG. 4 depicts a schematic diagram of one embodiment of a bit allocation scheme within the hot entry table of the aggregation working area of FIG. 3.

Allocating a reduced number of bits (relative to a typical working data type) allows several aggregate values to be tightly packed, or located adjacent to each other, within the aggregation working area 152. For example, if there are three aggregates on integer columns, and the three aggregates use 3 bits, 10 bits, and 5 bits, respectively, then the allocation manager 138 may allocate 18 (3+10+5=18) bits in total. Allocating 18 bits saves a significant amount of space compared with allocated 12 bytes (96 bits) for the same three integers using standard working data types. FIG. 4 shows an example of tightly packed aggregate values within the hot entry table 154 of the aggregation working area 152.

This type of bit allocation and storage can be accomplished through bit shifting and masking techniques. In one embodiment, the aggregation incrementor 140 performs such bit shifting and masking techniques, and possibly other bit operations, to increment intermediate running aggregate values used during the computation of final aggregate values. In some embodiments, each running aggregate is updated in the following way. First, the individual bits are extracted using mask and shift. The extracted bits are cast to the working data type of the aggregate. Then the running aggregate is incrementally updated, and the result of each update is written back to the individual bits.

In one embodiment, the overflow detector 142 determines if incrementing an aggregate value will overflow the allocated number of bits in the aggregation working area 152 of the cache 150 because the aggregate value and/or bit estimation turns out to be incorrect. Overflowing the allocated number of bits can potentially create problems in instances where several aggregate values are tightly packed, or located adjacent to each other, within the aggregation working area 152. In one embodiment, the overflow is handled by allocating space for the full working data type for each aggregate in each group and store the aggregate separately from the packed aggregates, e.g., in the memory 114 or disk 118. In some embodiments, when an aggregate stored in the packed mode overflows its value before update is written into the full size table, and then the bits in the tightly packed portion of the hot entry table 154 are set to zero. Additional description of embodiments of the overflow process is provided below with reference to FIGS. 6 and 9.

FIG. 4 depicts a schematic diagram of one embodiment of a bit allocation scheme within the hot entry table 154 of the aggregation working area 152 of FIG. 3. As shown in FIG. 4, the number of bits used for each running aggregate value can change, depending on the number of bits required or allocated for each running aggregate value. In particular, the Agg_1 value has six bits allocated; the Agg_2 value has 3 bits allocated; the Agg_3 value has 5 bits allocated; and the Agg_n value has 4 bits allocated.

Additionally, the allocated bits are tightly packed so that they are substantially adjacent to one another. In one embodiment, only the number of bits estimated by the bit estimator 136 is allocated to the corresponding running aggregate. Alternatively, the allocation manager 138 may allocate a number of extra bits in addition to the estimated number of bits. For example, one extra bit may be allocated by the allocation manager 138 in addition to the number of bits estimated by the bit estimator 136. In this example, the extra number of bits is static, so that the same number of extra bits is allocated regardless of the estimated number of bits. In other embodiments, the extra number of bits may be dynamically determined (e.g., as a percentage) depending on the estimated number of bits or another factor. In another embodiment, the allocated number of bits may correlate to specific threshold categories in standardized chunks of bits. For example, any value estimated to use less than four bits might be allocated four bits, while any number estimated to use less than eight bits might be allocated eight bits, and so forth. Other embodiments may use other techniques to store running aggregate values more or less tightly packed within the hot entry table 154.

Figures 5, 6:
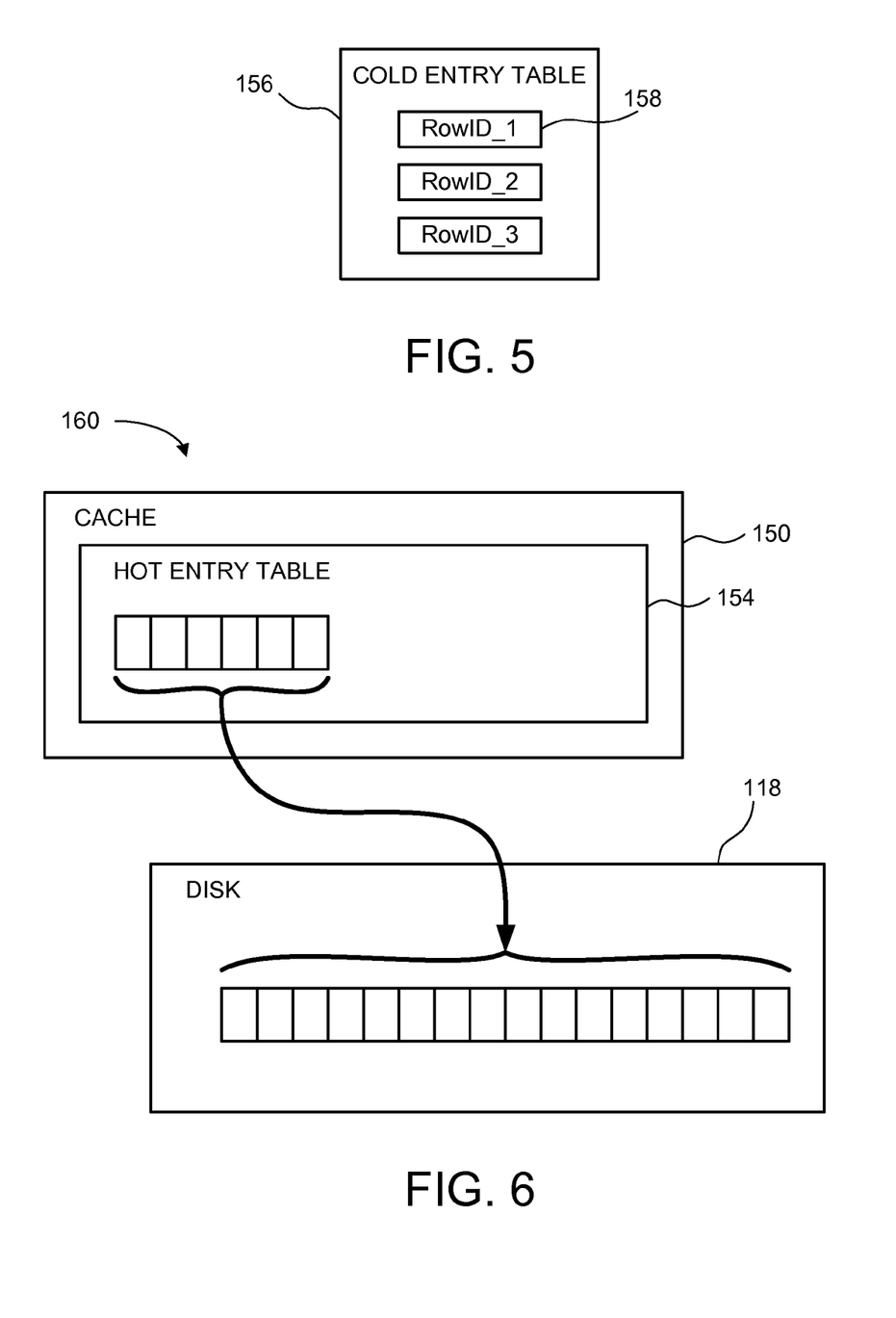
FIG. 5 depicts a schematic diagram of one embodiment of the cold entry table of the aggregation working area of FIG. 3.
FIG. 6 depicts a schematic diagram of one embodiment of a process for dealing with an overflow condition in the hot entry table of FIG. 4.

FIG. 5 depicts a schematic diagram of one embodiment of the cold entry table 156 of the aggregation working area 152 of FIG. 3. In contrast to the hot entry table 154, the cold entry table 156 may store running aggregate information other than the intermediate or final value of the running aggregate. In the illustrated embodiment, the cold entry table 156 stores row identifiers (RowIDs) for the infrequently accessed aggregate groups. Storing row identifiers may consume less resources in the cache 150 than storing actual running aggregate values, but still provide at least a slight improvement in terms of access time in case the same running aggregate information is requested more than once. In order to use a more compact portion of the aggregation working area 152 for the cold entry table 156, an in-frequent or cold group may be defined as any group for which there is only a small number of qualifying tuples touching this entry. That small number can be 1, 2, 3, or any other predefined threshold.

In one embodiment, an algorithm may be used to incrementally maintain aggregates stored in the hot and cold entry tables 154 and 156. One example of pseudo code for this algorithm includes the following:

```
input: groupby value, RID
for each qualifying tuple
    lookup the hot table
    if the groupby value is not in the hot table
        lookup the cold table
        if there are m RowIDs for the group
            populate the entry with its (groupby value, RowID);
        else /* the (m + 1) access to the group in cold table*/
            access aggregates via the RowIDs in the cold table;
            access aggregates via the RowID from the input;
            sum them up and populate the entry in the hot table;
            clear up the entry in the cold table;
```

Each of the hot and cold entry tables 154 and 156 may implement separate management schemes to identify, overwrite, and/or remove stale entries to make room for new entries. As one example, the oldest entries may be removed or overwritten to accommodate the newest entries. In light of the description provided herein, any one of a variety of cache replacement schemes may be implemented. Additionally, in some embodiments, the running aggregate information from the cold entry table 156 may be used to compute actual values to be stored in the hot entry table 154 in response to a determination that the aggregate group is a frequently accessed aggregate group. One example of a method for implementing this type of transition from the cold entry table 156 to the hot entry table 154 is described in more detail below with reference to FIG. 8.

FIG. 6 depicts a schematic diagram of one embodiment of a process 160 for dealing with an overflow condition in the hot entry table 154 of FIG. 4. In the illustrated embodiment, a running aggregate value (or other aggregate information) from the hot entry table 154 in the cache 150 is written out to a location on the disk 118. The location on the disk 118 has more space available to accommodate a larger value (i.e., more bits) than the location in the hot entry table 154 of the cache 150. Specifically, in the illustrated embodiment, two bytes (i.e., 16 bits) are allocated for the running aggregate value on the disk 118, in contrast to only six bits allocated for the running aggregate value on the cache 150.

Figure 7:
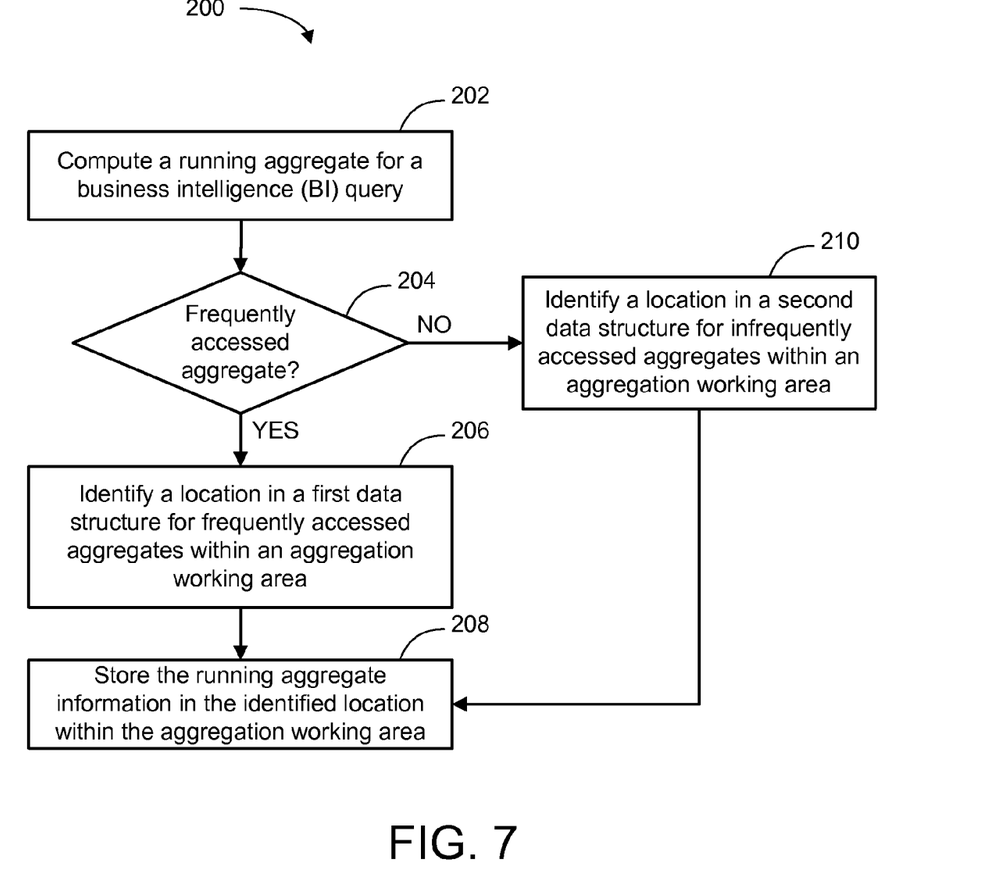
FIG. 7 depicts a flowchart diagram of one embodiment of a method for storing running aggregate information in first and second data structures within the aggregation working area of the cache of FIG. 3.

FIG. 7 depicts a flowchart diagram of one embodiment of a method 200 for storing running aggregate information in first and second data structures within the aggregation working area 152 of the cache 150 of FIG. 3. Although this illustrated method 200 is described in conjunction with the aggregation working area 152 of the cache 150, other embodiments may be implemented in conjunction with other data structures and/or within other caching environments.

The illustrated method 200 begins and the BI application 106 computes 202 a running aggregate for a BI query. The comparator 132 determines 204 if the running aggregate corresponds to a frequently accessed aggregate or aggregate group. If the running aggregate corresponds to a frequently accessed aggregate or aggregate group, then the allocation manager 138 identifies 206 a location in the data structure for the frequently accessed aggregate group (e.g., the hot entry table 154 in the aggregation working area 152 of the cache 150). Running aggregate information (e.g., the running aggregate value) is then stored 208 in the identified location of the data structure.

Alternatively, if the running aggregate does not correspond to a frequently accessed aggregate or aggregate group, then the allocation manager 138 identifies 210 a location in the data structure for the infrequently accessed aggregate group (e.g., the cold entry table 156 in the aggregation working area 152 of the cache 150). Running aggregate information (e.g., RowID for the running aggregate) is then stored 208 in the identified location of the data structure. The depicted method 200 then ends.

Figure 8:
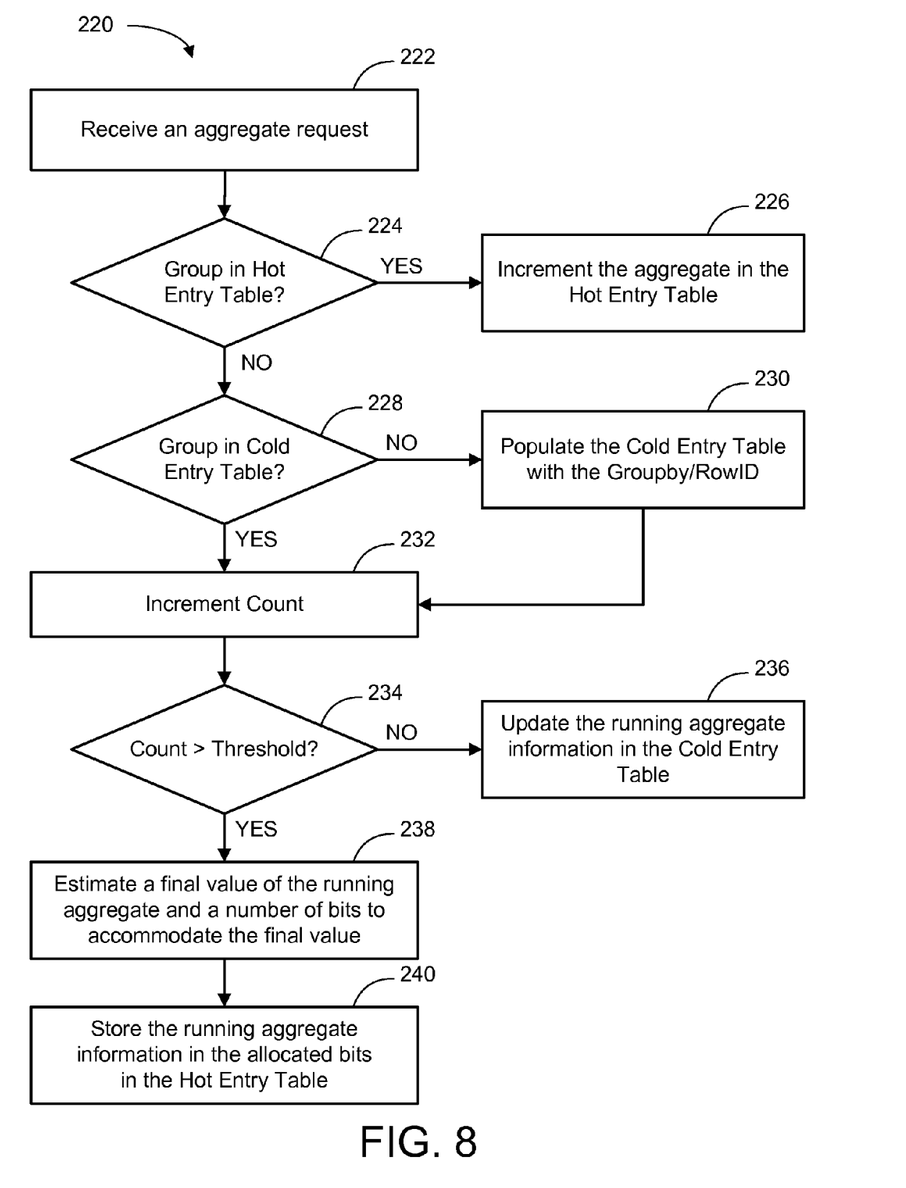
FIG. 8 depicts a flowchart diagram of another embodiment of a method for storing running aggregate information in first and second data structures within the aggregation working area of the cache of FIG. 3.

FIG. 8 depicts a flowchart diagram of another embodiment of a method 220 for storing running aggregate information in first and second data structures within the aggregation working area 152 of the cache 150 of FIG. 3. Although this illustrated method 220 is described in conjunction with the aggregation working area 152 of the cache 150, other embodiments may be implemented in conjunction with other data structures and/or within other caching environments.

The illustrated method 220 begins and the caching hierarchy 130 receives 222 a request for aggregate information. The caching hierarchy 130 then determines 224 if the requested aggregate group has running aggregate information stored in the hot entry table 154. If the requested aggregate group has running aggregate information stored in the hot entry table 154, then the caching hierarchy 130 accesses or increments 226 the aggregate information in the hot entry table 154.

Otherwise, if the requested aggregate group does not have running aggregate information stored in the hot entry table 154, then the caching hierarchy 130 determines 228 if the requested aggregate group has running aggregate information stored in the cold entry table 156. If the requested aggregate group does not have running aggregate information stored in the cold entry table 156, then the caching hierarchy 130 populates 230 the cold entry table 156 with the RowID and/or other running aggregate information corresponding to the aggregate or aggregate group.

Alternatively, if the requested aggregate group does have running aggregate information stored in the cold entry table 156, then the caching hierarchy 130 increments 232 a count associated with the requested aggregate group. The comparator 132 then determines 234 if the count is greater than (or possibly equal to) the threshold 144. If the count does not meet the threshold 144, then the caching hierarchy 130 updates 236 the running aggregate information in the cold entry table 156. Otherwise, if the count meets the threshold 144 then the aggregate group is moved from the cold entry table 156 to the hot entry table 154. In some embodiments, the aggregate estimator 134 estimates 238 a final value of the running aggregate, and the bit estimator 136 estimates a number of bits to accommodate the final value of the running aggregate in the hot entry table 154. The allocation manager 138 then stores 240 the running aggregate information in the allocated bits in the hot entry table 154 of the aggregation working area 152. The depicted method 220 then ends.

Figure 9:
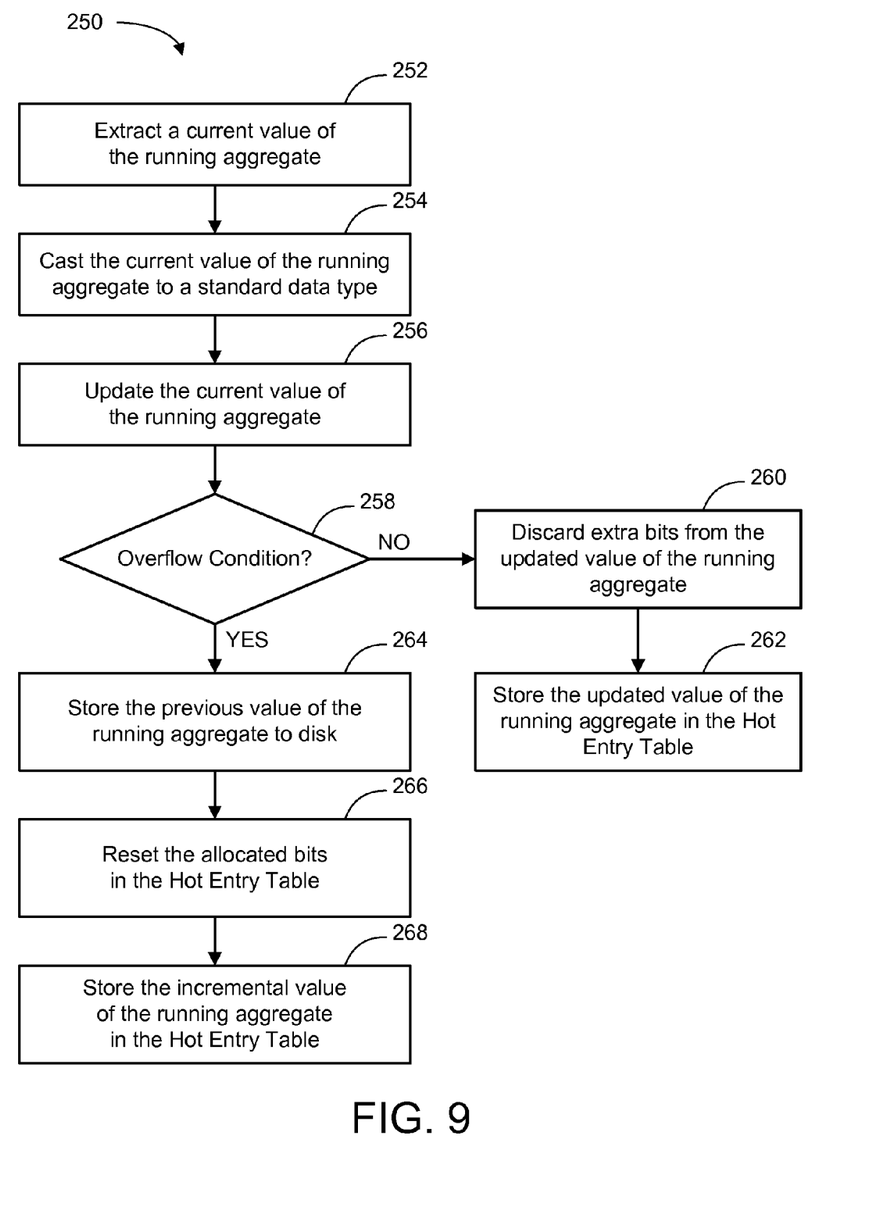
FIG. 9 depicts a flowchart diagram of one embodiment of a method for handling an overflow condition of an entry within the hot entry table within the aggregation working area of the cache of FIG. 6.

FIG. 9 depicts a flowchart diagram of one embodiment of a method 250 for handling an overflow condition of an entry within the hot entry table 154 within the aggregation working area 152 of the cache 150 of FIG. 6. Although this illustrated method 250 is described in conjunction with the aggregation working area 152 of the cache 150, other embodiments may be implemented in conjunction with other data structures and/or within other caching environments.

The illustrate method 250 begins and the aggregation incrementor 140 extracts 252 a current value of the running aggregate. The aggregation incrementor 140 then casts 254 the current value of the running aggregate to a standard working data type and updates 256 the current value of the running aggregate. This update does not occur at the same location as the allocated bits within the hot entry table 154 for that running aggregate.

The overflow detector 142 then determines 258 if there is an overflow condition. Basically, an overflow condition occurs when the updated running aggregate values becomes too large to store in the allocated bits within the hot entry table 154 of the cache 150. If there is not an overflow condition, then the aggregation incrementor discards 260 extra bits from the updated value of the running aggregate value, and the allocation manager 138 stores 262 the updated value of the running aggregate in the hot entry table 154.

Otherwise, if there is an overflow condition, then the caching hierarchy 130 stores 264 the previous value of the running aggregate to the disk 118 (or another location with more storage space). The allocation manager 138 resets 266 the allocated bits in the hot entry table 154, and the aggregation incrementor 140 stores 268 the incremental value of the running aggregate in the hot entry table 154. The depicted method 250 then ends.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations described herein.

Embodiments of the invention can take the form of an entirely hardware embodiment, an entirely software embodiment, or an embodiment containing both hardware and software elements. In one embodiment, the invention is implemented in software, which includes but is not limited to firmware, resident software, microcode, etc.

Furthermore, embodiments of the invention can take the form of a computer program product accessible from a computer-usable or computer-readable storage medium providing program code for use by or in connection with a computer or any instruction execution system. For the purposes of this description, a computer-usable or computer readable storage medium can be any apparatus that can store the program for use by or in connection with the instruction execution system, apparatus, or device.

The computer-useable or computer-readable storage medium can be an electronic, magnetic, optical, electromagnetic, infrared, or semiconductor system (or apparatus or device), or a propagation medium. Examples of a computer-readable storage medium include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

An embodiment of a data processing system suitable for storing and/or executing program code includes at least one processor coupled directly or indirectly to memory elements through a system bus such as a data, address, and/or control bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Additionally, network adapters also may be coupled to the system to enable the data processing system to become coupled to other data processing systems or remote printers or storage devices through intervening private or public networks. Modems, cable modems, and Ethernet cards are just a few of the currently available types of network adapters.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A computer program product comprising a non-transitory computer useable storage medium to store a computer readable program, wherein the computer readable program, when executed on a computer, causes the computer to perform operations comprising:
    computing a running aggregate for a group within a business intelligence (BI) query;
    identifying a location to store running aggregate information within an aggregation working area of a cache, wherein the aggregation working area comprises:
        a first data structure for storing running aggregate information that is associated with a group that is accessed frequently relative to a threshold; and
        a second data structure for storing running aggregate information that is associated with a group that is accessed infrequently relative to the threshold;
    estimating a final value of the running aggregate;
    estimating a number of bits for storing the final value of the running aggregate;
    allocating the estimated number of bits within either the first or second data structure; and
    storing the running aggregate information in either the first or second data structure of the aggregation working area based on a characterization of the group as a frequently or infrequently accessed group.

2. The computer program product of claim 1, wherein:
    the running aggregate comprises a value calculated during an aggregation operation; and
    the running aggregate information comprises information related to the running aggregate.

3. The computer program product of claim 1, wherein execution of the computer readable program causes the computer to perform further operations comprising incrementally maintaining the running aggregate during a series of aggregation operations, wherein the aggregation operations comprise:
    extracting a current value of the running aggregate from the allocated bits at the first location;
    casting the current value of the running aggregate to a standard data type of business data for which the running aggregate is computed;
    updating the current value of the running aggregate to reflect further aggregation with new business data;
    discarding extra bits from the updated value of the running aggregate; and
    storing the updated value of the running aggregate to the allocated bits at the first location.

4. The computer program product of claim 3, wherein execution of the computer readable program causes the computer to perform further operations comprising handling an overflow condition of the allocated bits at the first location, wherein handling the overflow condition comprises:
    detecting the overflow condition in response to a determination that the updated value of the running aggregate requires more bits than the allocated bits at the first location;
    storing the current value, prior to updating, of the running aggregate in another location of another data structure separate from the first and second data structures;
    resetting the current value of the running aggregate in the first data structure to zero; and
    storing an incremental value of the running aggregate in the first data structure.

5. The computer program product of claim 1, wherein, in response to a determination that the group is accessed infrequently relative to the threshold, the running aggregate information comprises a location identifier within the second data structure.

6. The computer program product of claim 5, wherein the location identifier within the second data structure comprises a group identifier.

7. The computer program product of claim 1, wherein a total size of location identifiers associated with a group in the second data structure is smaller than a size of running aggregates associated with a group in the first data structure.

8. The computer program product of claim 1, wherein the threshold comprises a tuple threshold, and the frequently accessed group has a first number of tuples touching the group that is greater than the tuple threshold, and the infrequently accessed group has a second number of tuples touching the group that is less than or equal to the tuple threshold.

9. A computer-implemented method for implementing an aggregation working area, the method comprising:
    computing a running aggregate for a group within a business intelligence (BI) query;

identifying a location to store running aggregate information within the aggregation working area of a cache, wherein the aggregation working area comprises:
- a first data structure for storing running aggregate information that is associated with a group that is accessed frequently relative to a threshold; and
- a second data structure for storing running aggregate information that is associated with a group that is accessed infrequently relative to the threshold;

wherein the threshold comprises a tuple threshold, and the frequently accessed group has a first number of tuples touching the group that is greater than the tuple threshold, and the infrequently accessed group has a second number of tuples touching the group that is less than or equal to the tuple threshold; and storing the running aggregate information in either the first or second data structure of the aggregation working area based on a characterization of the group as a frequently or infrequently accessed group.

10. The computer-implemented method of claim 9, further comprising:
determining that the group is a frequently accessed group, wherein the running aggregate information comprises a value of the running aggregate;
estimating a final value of the running aggregate;
estimating a number of bits for storing the final value of the running aggregate; and
allocating the estimated number of bits within the first data structure for storing the running aggregate, wherein the allocated bits for the running aggregate are located at a first location within the first data structure.

11. The computer-implemented method of claim 9, further comprising:
tightly packing a plurality of running aggregates into the first data structure, wherein each of the plurality of running aggregates are located at adjacent locations using separately estimated numbers of bits, wherein each estimated number of bits is less than a standard number of bits for a working data type of the business data from which the corresponding running aggregate is computed.

12. The computer-implemented method of claim 9, further comprising incrementally maintaining the running aggregate during a series of aggregation operations, wherein the aggregation operations comprise:
extracting a current value of the running aggregate from the allocated bits at the first location;
casting the current value of the running aggregate to a standard data type of business data for which the running aggregate is computed;
updating the current value of the running aggregate to reflect further aggregation with new business data;
discarding extra bits from the updated value of the running aggregate; and
storing the updated value of the running aggregate to the allocated bits at the first location.

13. The computer-implemented method of claim 12, further comprising handling an overflow condition of the allocated bits at the first location, wherein handling the overflow condition comprises:
detecting the overflow condition in response to a determination that the updated value of the running aggregate requires more bits than the allocated bits at the first location;
storing the current value, prior to updating, of the running aggregate in another location of another data structure separate from the first and second data structures;
resetting the current value of the running aggregate in the first data structure to zero; and
storing an incremental value of the running aggregate in the first data structure.

14. The computer-implemented method of claim 9, further comprising:
determining that the group is an infrequently accessed group; and
storing a row identifier as the running aggregate information in the second data structure of the aggregation working area.

15. A system comprising:
a multi-core processor, wherein each core is configured to run at least one thread;
a cache within a caching hierarchy coupled to the multi-core processor, wherein the cache is configured to implement an aggregation working area for each thread, and each aggregation working area is configured to store running aggregate information associated with an aggregation function of a business intelligence (BI) platform;
wherein the caching hierarchy is configured to implement separate data structures for aggregates of frequently and infrequently accessed groups within each aggregation working area; and
wherein the caching hierarchy is further configured to implement a first data structure for storing running aggregate information that is associated with a group that is accessed frequently relative to a threshold, wherein the running aggregate information for the frequently accessed group comprises a value of a running aggregate computed according to the aggregation function.

16. The system of claim 15, wherein the caching hierarchy is further configured to store different types of running aggregate information for the frequently and infrequently accessed groups.

17. The system of claim 15, wherein the caching hierarchy is further configured to implement a second data structure for storing running aggregate information that is associated with a group that is accessed infrequently relative to the threshold, wherein the running aggregate information for the infrequently accessed group comprises a location identifier to indicate a location of corresponding business data within the BI platform.

18. The system of claim 15, wherein the caching hierarchy is further configured to store the running aggregate information for the frequently and infrequently accessed groups in compressed formats that are smaller in bit number than a working data type of business data stored within the BI platform from which running aggregates are computed.

19. A system comprising:
a multi-core processor, wherein each core is configured to run at least one thread; and
a cache within a caching hierarchy coupled to the multi-core processor, wherein the cache is configured to implement an aggregation working area for each thread, and each aggregation working area is configured to store running aggregate information associated with an aggregation function of a business intelligence (BI) platform, wherein the running aggregate information comprises information related to a running aggregate which comprises a value calculated according to the aggregation function;
wherein the caching hierarchy is configured to implement separate a first data structure for aggregates of frequently accessed groups and a second data structure for aggregates of infrequently accessed groups, and to store a plurality of running aggregates into the first data structure for storing the aggregates associated with a group that is frequently accessed, wherein each of the plurality of running aggregates are located at adjacent locations using separately estimated numbers of bits, wherein each estimated number of bits is less than a standard number of bits for a working data type of the business data from which the corresponding running aggregate is computed.

20. The system of claim 19, wherein the caching hierarchy is further configured to implement:
- a first data structure for storing running aggregate information that is associated with a group that is accessed frequently relative to a threshold, wherein the running aggregate information for the frequently accessed group comprises a value of a running aggregate computed according to the aggregation function and stored in a compressed format that is smaller in bit number than a standard number of bits for a working data type of the business data from which the corresponding running aggregate is computed; and
- a second data structure for storing running aggregate information that is associated with a group that is accessed infrequently relative to the threshold, wherein the running aggregate information for the infrequently accessed group comprises a location identifier to indicate a location of corresponding business data within the BI platform, wherein the location identifier is smaller in bit number than the standard number of bits for the working data type of the business data from which the corresponding running aggregate is computed.

* * * * *